(12) United States Patent
Balfe

(10) Patent No.: US 6,774,788 B1
(45) Date of Patent: Aug. 10, 2004

(54) NAVIGATION DEVICE FOR USE BY THE VISUALLY IMPAIRED

(76) Inventor: Thomas J. Balfe, 411 N. Briggs Ave. #424, Sarasota, FL (US) 34237

( * ) Notice: Subject to any disclaimer, the term of this patent is extended or adjusted under 35 U.S.C. 154(b) by 24 days.

(21) Appl. No.: 10/266,201

(22) Filed: Oct. 7, 2002

(51) Int. Cl.[7] .............................................. G08B 1/08
(52) U.S. Cl. ............. 340/539.13; 340/7.6; 340/825.19; 340/539.11; 340/539.22; 340/559.23; 340/407.1
(58) Field of Search ............................ 340/539.13, 7.6, 340/825.19, 539.11, 539.18, 539.2, 539.22, 539.23, 407.1, 407.2

(56) References Cited

U.S. PATENT DOCUMENTS

| | | | | |
|---|---|---|---|---|
| 5,466,154 A | * | 11/1995 | Thompson | 434/114 |
| 5,636,038 A | * | 6/1997 | Lynt et al. | 358/471 |
| 5,942,970 A | * | 8/1999 | Norman | 340/407.1 |
| 6,459,364 B2 | * | 10/2002 | Gupta | 340/407.1 |
| 6,502,032 B1 | * | 12/2002 | Newman | 701/213 |
| 6,636,202 B2 | * | 10/2003 | Ishmael et al. | 345/173 |

* cited by examiner

*Primary Examiner*—Toan N. Pham

(57) ABSTRACT

A handheld navigation device for use by the visually impaired having a camera electrically connected to a microprocessor. The microprocessor is capable of object and character recognition and translation into Braille. A Braille display is electrically connected to the microprocessor. A speaker is electrically connected to the microprocessor for audibly communicating common objects and distances and character recognition translations to the user.

20 Claims, 5 Drawing Sheets

NAVIGATION DEVICE FOR USE BY THE VISUALLY IMPAIRED

BACKGROUND OF THE INVENTION

1. Field of the Invention

The present invention relates to a navigation device for use by the visually impaired for use in connection with obstacle avoidance devices for the blind. The navigation device for use by the visually impaired has particular utility in connection with navigation device capable of reading signs and outputting Braille.

2. Description of the Prior Art

Navigation devices for use by the visually impaired are desirable to provide visually impaired individuals with a variety of visual recognition and text recognition capabilities.

The use of obstacle avoidance devices for the blind is known in the prior art. For example, U.S. Pat. No. 5,097,856 to Chi-Sheng discloses an electronic talking stick for the blind that talks for walking instructions and how to go upstairs and downstairs. The stick also warns a blind man of dangerous depression in road, and calls for help when a blind man who uses the stick falls. It is generally comprised of a supporting rod, a control box, a handle, a free steering caster, and a horizontal scanning device. The free steering caster helps the whole assembly to slide; two detectors in the control box and a range finder and moving object detector in the handle are arranged for trouble detection to let detected signals be converted into voice, by means of the processing through a control circuit, to instruct the user through an earphone connected to the handle. However, the Chi-Sheng '856 patent does not include character recognition and the capability to output data in Braille.

Similarly, U.S. Pat. No. 6,198,395 to Sussman discloses a sensor for sight impaired individuals that includes an array of laser transmitters for transmitting laser signals in given areas corresponding to each of the laser transmitters. An array of laser sensors are provided for receiving laser signals reflected from objects in the corresponding given areas with each laser sensor corresponding to a respective one of the array of laser transmitters. The time between transmitted and received laser signals of a laser transmitter and the respective laser sensor is indicative of the distance between the user and an object in the corresponding given area. A processor is operable with the laser transmitters and laser sensors to effect scanning of the given areas by the array and to process the transmitted and received signals to determine the distance between the user and an object in the given areas. A feedback system is operable with the processor for generating a feedback signal for each of the laser sensors as a function of the received laser signals. The sensing system and method may also include an array of ultrasonic transducers. However, the Sussman '395 patent does not include character recognition and the capability to output data in Braille.

Lastly, U.S. Pat. No. Des 440,505 to Laverick discloses a portable hand held navigational device that is the case for a global position unit. However, the Laverick '505 patent does not include character recognition and the capability to output data in Braille.

While the above-described devices fulfill their respective, particular objectives and requirements, the aforementioned patents do not describe a navigation device for use by the visually impaired that allows navigation device capable of reading signs and outputting Braille. The Chi-Sheng '856, Sussman '395 and Laverick '505 patents make no provision for character recognition and the capability to output data in Braille.

Therefore, a need exists for a new and improved navigation device for use by the visually impaired which can be used for navigation device capable of reading signs and outputting Braille. In this regard, the present invention substantially fulfills this need.

In this respect, the navigation device for use by the visually impaired according to the present invention substantially departs from the conventional concepts and designs of the prior art, and in doing so provides an apparatus primarily developed for the purpose of navigation device capable of reading signs and outputting Braille.

SUMMARY OF THE INVENTION

In view of the foregoing disadvantages inherent in the known types of obstacle avoidance devices for the blind now present in the prior art, the present invention provides an improved navigation device for use by the visually impaired, and overcomes the above-mentioned disadvantages and drawbacks of the prior art. As such, the general purpose of the present invention, which will be described subsequently in greater detail, is to provide a new and improved navigation device for use by the visually impaired and method which has all the advantages of the prior art mentioned heretofore and many novel features that result in a navigation device for use by the visually impaired which is not anticipated, rendered obvious, suggested, or even implied by the prior art, either alone or in any combination thereof.

To attain this, the present invention essentially comprises a camera connected to a housing. A microprocessor is electrically connected to the camera. The microprocessor is capable of character recognition and translation into Braille. A Braille display is electrically connected to the microprocessor. The Braille display is capable of outputting the translated Braille. The Braille display is connected to the housing. A proximity sensor is electrically connected to the microprocessor. The proximity sensor is connected to the housing. A speaker is electrically connected to the microprocessor, and the speaker is connected to the housing.

There has thus been outlined, rather broadly, the more important features of the invention in order that the detailed description thereof that follows may be better understood and in order that the present contribution to the art may be better appreciated.

The invention may also include a satellite positioning circuit, a non-volatile memory, a wireless receiver, a wireless finder unit, a universal serial bus, a microphone, a power switch, a power source connection, a function switch, a line out port, a headphone set and a battery charge port. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved navigation device for use by the visually impaired that has all of the advantages of the prior art obstacle avoidance devices for the blind and none of the disadvantages.

It is another object of the present invention to provide a new and improved navigation device for use by the visually impaired that may be easily and efficiently manufactured and marketed.

An even further object of the present invention is to provide a new and improved navigation device for use by the visually impaired that has a low cost of manufacture with regard to both materials and labor, and which accordingly is then susceptible of low prices of sale to the consuming public, thereby making such navigation device for use by the visually impaired economically available to the buying public.

Still another object of the present invention is to provide a new navigation device for use by the visually impaired that provides in the apparatuses and methods of the prior art some of the advantages thereof, while simultaneously overcoming some of the disadvantages normally associated therewith.

Even still another object of the present invention is to provide a navigation device for use by the visually impaired for navigation device capable of reading signs and outputting Braille.

Still yet another object of the present invention is to provide a navigation device for use by the visually impaired that has visual recognition features to aid in short range personal navigation.

Lastly, it is an object of the present invention is to provide a navigation device for use by the visually impaired that has satellite positioning features to aid in both short range personal navigation and long range personal navigation.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
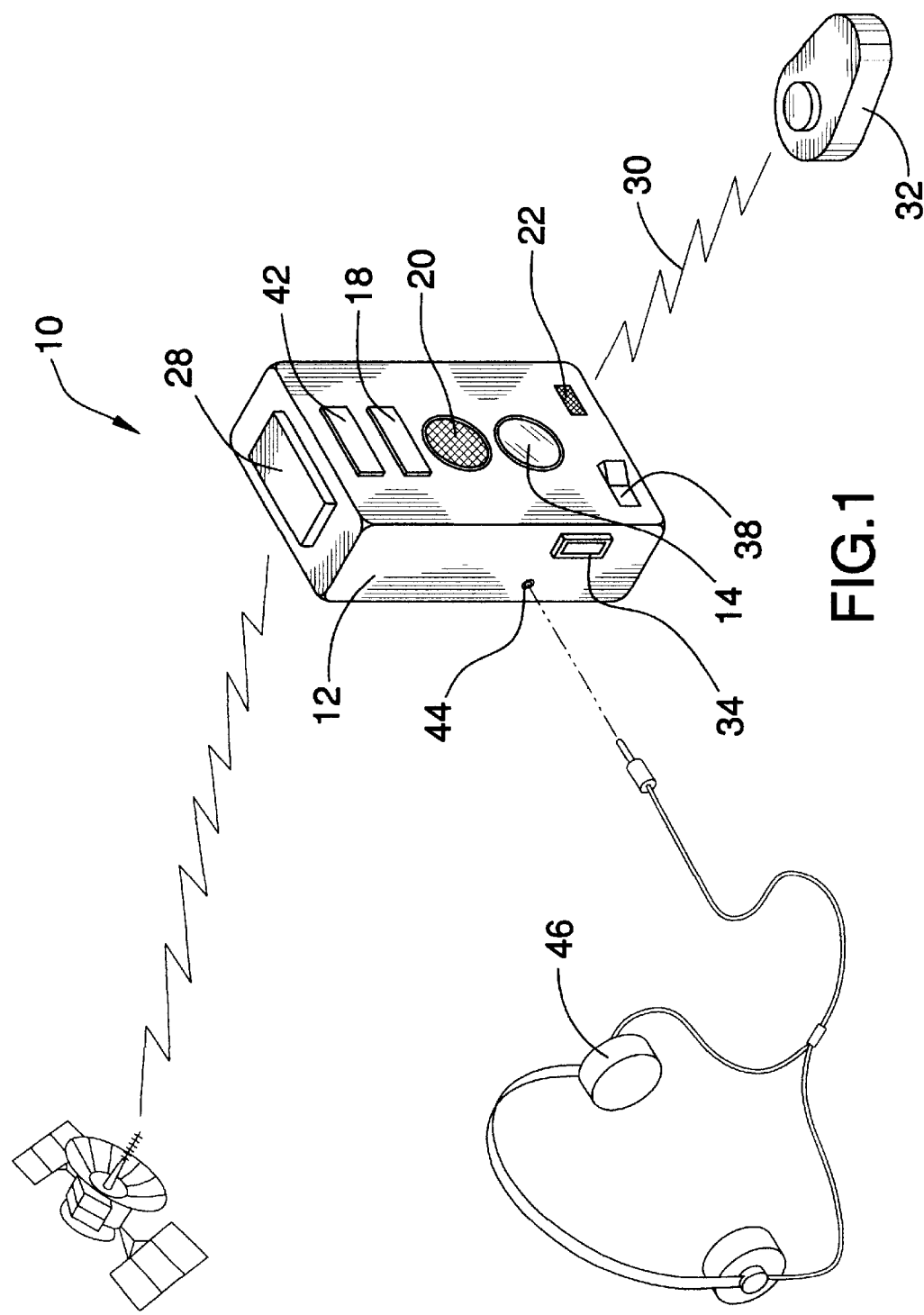
FIG. 1 is a top perspective view of the preferred embodiment of the navigation device for use by the visually impaired constructed in accordance with the principles of the present invention.

Referring now to the drawings, and particularly to FIGS. 1–5, a preferred embodiment of the navigation device for use by the visually impaired of the present invention is shown and generally designated by the reference numeral 10.

In FIG. 1, a new and improved navigation device for use by the visually impaired 10 of the present invention for navigation device capable of reading signs and outputting Braille is illustrated and will be described. More particularly, the navigation device for use by the visually impaired 10 has a camera 14 connected to a housing 12. A microprocessor 16 (shown in FIG. 5) is electrically connected to the camera 14. The microprocessor 16 is capable of character recognition and translation into Braille. A Braille display 18 is electrically connected to the microprocessor 16. The Braille display 18 is capable of outputting the translated Braille. The Braille display 18 is connected to the housing 12. A proximity sensor 20 is electrically connected to the microprocessor 16. The proximity sensor 20 is connected to the housing 12. A speaker 22 is electrically connected to the microprocessor 16. The speaker 22 is connected to the housing 12. A wireless receiver 28 (shown in FIG. 5) is electrically connected to the microprocessor 16. The wireless receiver 28 is capable of detecting a wireless finder signal 30. A wireless finder unit 32 is capable of emitting the wireless finder signal 30. A universal serial bus port 34 is electrically connected to the microprocessor 16. The universal serial bus port 34 is connected to the housing 12. A microphone 36 is electrically connected to the microprocessor 16. The microphone 36 is connected to the housing 12. A power switch 38 is electrically connected to the microprocessor 16. The power switch 38 is slidably connected to the housing 12. A power source connection 40 is electrically connected to the microprocessor 16. At least one function switch 42 is electrically connected to the microprocessor 16. The function switch 42 is slidably connected to the housing 12. A line out port 44 is electrically connected to the microprocessor 16. The line out port 44 is connected to the housing 12. A headphone set 46 electrically connectable to the line out port 44.

Figure 2:
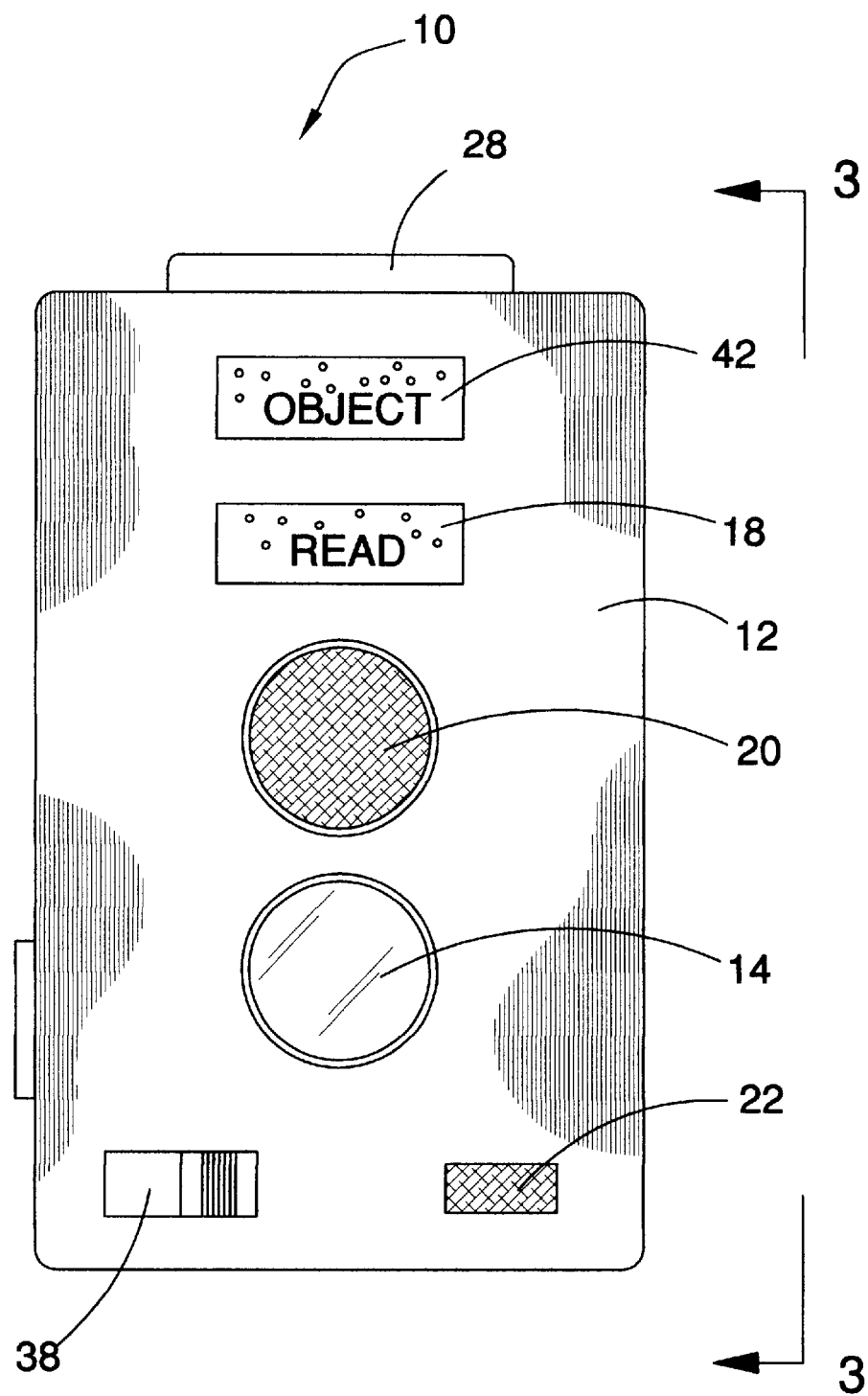
FIG. 2 is a front side view of the navigation device for use by the visually impaired of the present invention.

In FIG. 2, the navigation device for use by the visually impaired 10 is illustrated and will be described. The navigation device for use by the visually impaired 10 has the camera 14 connected to the housing 12. The Braille display 18 is connected to the housing 12. The proximity sensor 20 is connected to the housing 12. The speaker 22 is connected to the housing 12. The microphone 36 is connected to the housing 12. The power switch 38 is slidably connected to the housing 12. The function switch 42 is slidably connected to the housing 12.

Figure 3:
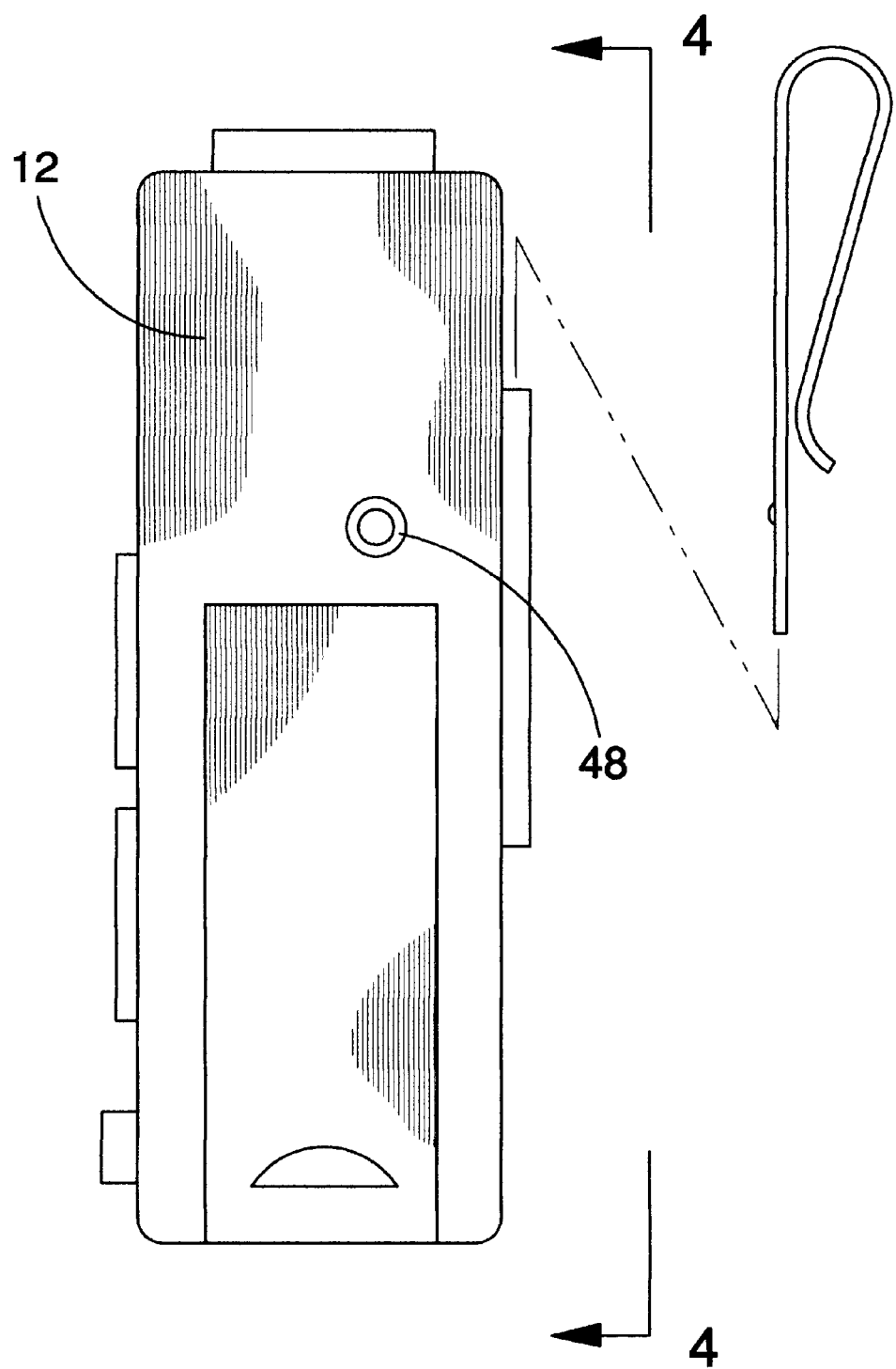
FIG. 3 is a right side 3—3 view of FIG. 2 of the navigation device for use by the visually impaired of the present invention.

In FIG. 3, the navigation device for use by the visually impaired 10 is illustrated and will be described. A battery charge port 48 is electrically connected to the microprocessor 16 (shown in FIG. 5). The battery charge port 48 is connected to the housing 12.

Figure 4:
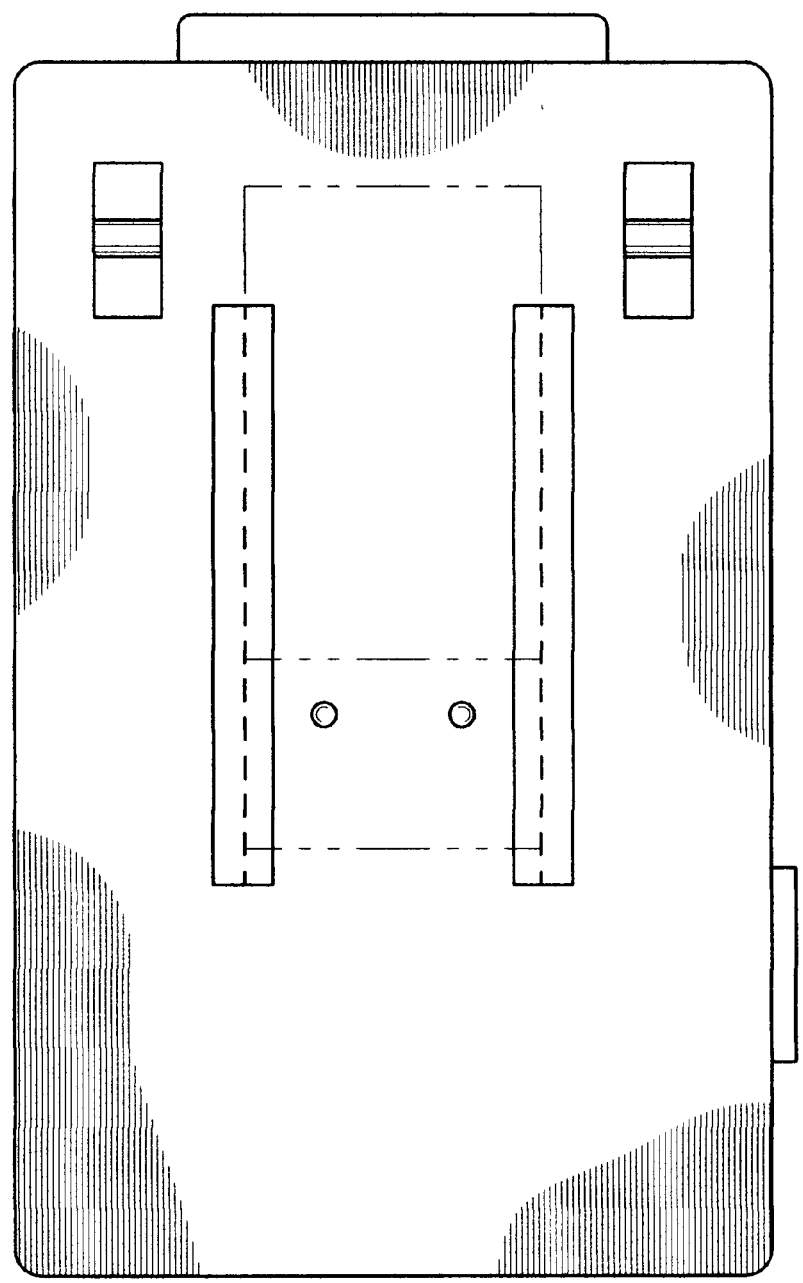
FIG. 4 is a rear side 4—4 view of FIG. 3 of the navigation device for use by the visually impaired of the present invention.

In FIG. 4, the navigation device for use by the visually impaired 10 is illustrated and will be described. The invention has recessed pins for clipping on a wrist strap or neck lanyard. The invention also has an optional belt clip with detents for allowing the belt clip to be removable.

Figure 5:
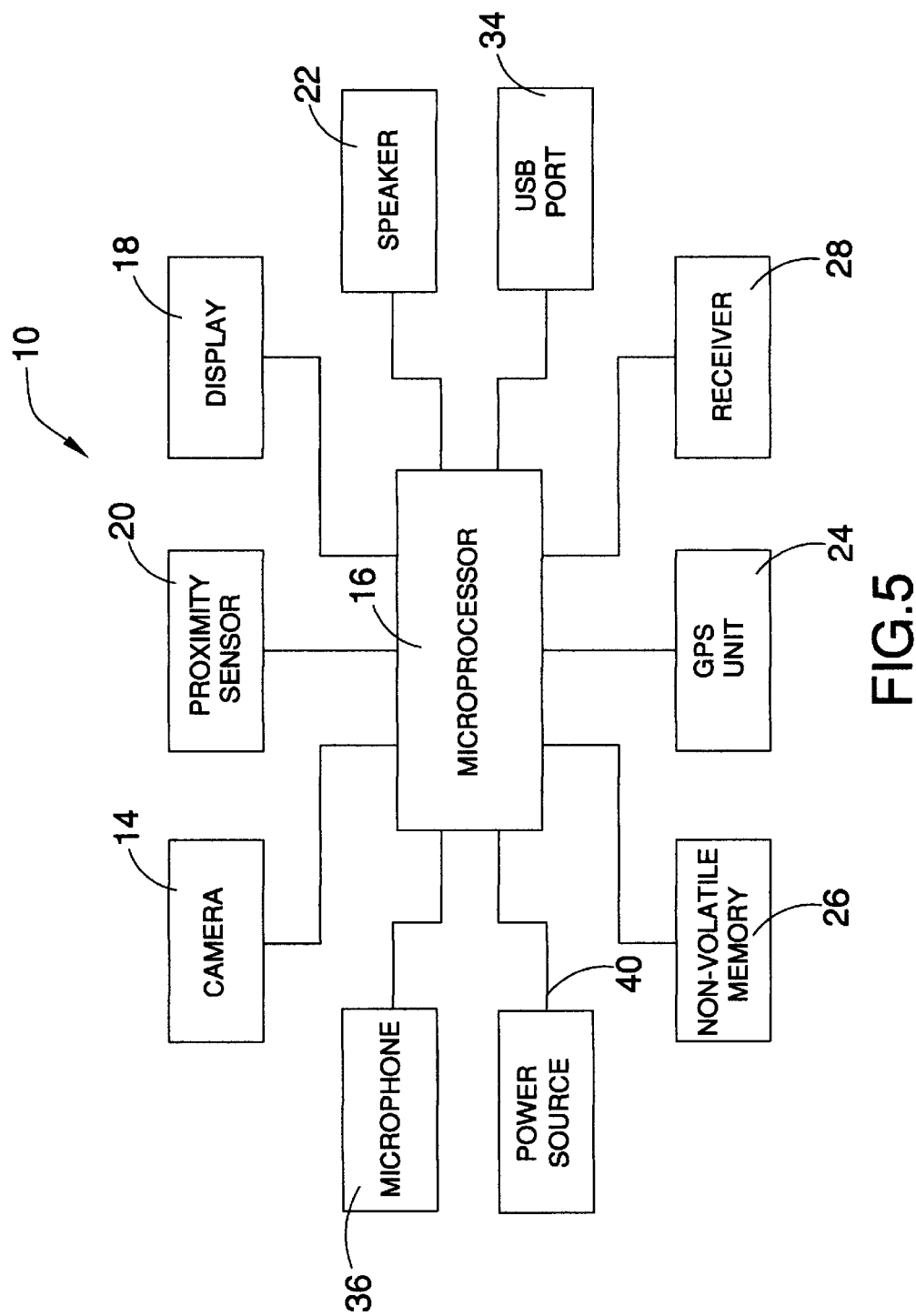
FIG. 5 is a block diagram view of the navigation device for use by the visually impaired of the present invention.

In FIG. 5, the navigation device for use by the visually impaired 10 is illustrated and will be described. The microprocessor 16 is electrically connected to the camera 14. The microprocessor 16 is capable of character recognition and translation into Braille. The Braille display 18 is electrically connected to the microprocessor 16. The Braille display 18 is capable of outputting the translated Braille. The proximity sensor 20 is electrically connected to the microprocessor 16. The speaker 22 is electrically connected to the microprocessor 16. A satellite positioning circuit 24 is electrically connected to the microprocessor 16. A non-volatile memory 26 is electrically connected to the microprocessor 16. The wireless receiver 28 is electrically connected to the microprocessor 16. The wireless receiver 28 is capable of detecting the wireless finder signal 30. The universal serial bus port 34 is electrically connected to the microprocessor 16. The microphone 36 is electrically connected to the microprocessor 16. The power switch 38 is electrically connected to the microprocessor 16. The power source connection 40 is electrically connected to the microprocessor 16.

In use it can now be understood that the navigation device for use by the visually impaired 10 has a simple set of function switches 42 that would allow the user to switch the device between visual recognition and text recognition modes. The object recognition mode would be limited to recognizing objects commonly encountered in everyday pedestrian travel situations. Item recognition could determine the nature of objects from doors and doorknobs to stairs, handrails, elevators, tables, chairs, sinks and toilets. Outdoors the device could recognize telephone poles, street signs, traffic signs, establishment signs and the status of traffic lights. When such an outdoor sign was scanned and recognized, it could automatically switch to a text reading mode to announce or display in Braille the sign information. Scanned and recognized objects could also be announced together with the approximate distance in feet to the object.

While a preferred embodiment of the navigation device for use by the visually impaired has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material plastic may be used instead of the metal housing described. And although navigation device capable of reading signs and outputting Braille have been described, it should be appreciated that the navigation device for use by the visually impaired herein described is also suitable for navigating in another country where the navigation device would interpret and lead the individual from place to place.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A navigation device for use by the visually impaired comprising:

a housing;

a camera connected to said housing;

a microprocessor electrically connected to said camera, said microprocessor capable of character recognition and translation into Braille;

a Braille display electrically connected to said microprocessor, said Braille display capable of outputting said translated Braille, said Braille display connected to said housing;

a proximity sensor electrically connected to said microprocessor, said proximity sensor connected to said housing; and a speaker electrically connected to said microprocessor, said speaker connected to said housing.

2. The navigation device for use by the visually impaired of claim 1 further comprising:

a satellite positioning circuit electrically connected to said microprocessor.

3. The navigation device for use by the visually impaired of claim 1 further comprising:

a wireless receiver electrically connected to said microprocessor, said wireless receiver capable of detecting a wireless finder signal; and a wireless finder unit capable of emitting a wireless finder signal.

4. The navigation device for use by the visually impaired of claim 1 further comprising:

a universal serial bus port electrically connected to said microprocessor, said universal serial bus port connected to said housing.

5. The navigation device for use by the visually impaired of claim 1 further comprising:

a microphone electrically connected to said microprocessor, said microphone connected to said housing.

6. The navigation device for use by the visually impaired of claim 1 further comprising:

a power source connection electrically connected to said microprocessor.

7. The navigation device for use by the visually impaired of claim 1 further comprising:

a non-volatile memory electrically connected to said microprocessor.

8. The navigation device for use by the visually impaired of claim 1 further comprising:

a power switch electrically connected to said microprocessor, said power switch slidably connected to said housing.

9. The navigation device for use by the visually impaired of claim 1 further comprising:

at least one function switch electrically connected to said microprocessor, said function switch slidably connected to said housing.

10. The navigation device for use by the visually impaired of claim 1 further comprising:

a line out port electrically connected to said microprocessor, said line out port connected to said housing; and a headphone set electrically connectable to said line out port.

11. The navigation device for use by the visually impaired of claim 1 further comprising:
- a battery charge port electrically connected to said microprocessor, said battery charge port connected to said housing.

12. A navigation device for use by the visually impaired comprising:
- a housing;
- a camera connected to said housing;
- a microprocessor electrically connected to said camera, said microprocessor capable of character recognition and translation into Braille;
- a Braille display electrically connected to said microprocessor, said Braille display capable of outputting said translated Braille, said Braille display connected to said housing;
- a proximity sensor electrically connected to said microprocessor, said proximity sensor connected to said housing;
- a speaker electrically connected to said microprocessor, said speaker connected to said housing;
- a satellite positioning circuit electrically connected to said microprocessor; and
- a non-volatile memory electrically connected to said microprocessor.

13. The navigation device for use by the visually impaired of claim 12 further comprising:
- a wireless receiver electrically connected to said microprocessor, said wireless receiver capable of detecting a wireless finder signal; and
- a wireless finder unit capable of emitting a wireless finder signal.

14. The navigation device for use by the visually impaired of claim 13 further comprising:
- a universal serial bus port electrically connected to said microprocessor, said universal serial bus port connected to said housing.

15. The navigation device for use by the visually impaired of claim 14 further comprising:
- a microphone electrically connected to said microprocessor, said microphone connected to said housing.

16. The navigation device for use by the visually impaired of claim 15 further comprising:
- a power switch electrically connected to said microprocessor, said power switch slidably connected to said housing; and
- a power source connection electrically connected to said microprocessor.

17. The navigation device for use by the visually impaired of claim 16 further comprising:
- at least one function switch electrically connected to said microprocessor, said function switch slidably connected to said housing.

18. The navigation device for use by the visually impaired of claim 17 further comprising:
- a line out port electrically connected to said microprocessor, said line out port connected to said housing; and
- a headphone set electrically connectable to said line out port.

19. The navigation device for use by the visually impaired of claim 18 further comprising:
- a battery charge port electrically connected to said microprocessor, said battery charge port connected to said housing.

20. A navigation device for use by the visually impaired comprising:
- a housing;
- a camera connected to said housing;
- a microprocessor electrically connected to said camera, said microprocessor capable of character recognition and translation into Braille;
- a Braille display electrically connected to said microprocessor, said Braille display capable of outputting said translated Braille, said Braille display connected to said housing;
- a proximity sensor electrically connected to said microprocessor, said proximity sensor connected to said housing;
- a speaker electrically connected to said microprocessor, said speaker connected to said housing;
- a satellite positioning circuit electrically connected to said microprocessor;
- a non-volatile memory electrically connected to said microprocessor;
- a wireless receiver electrically connected to said microprocessor, said wireless receiver capable of detecting a wireless finder signal;
- a wireless finder unit capable of emitting a wireless finder signal;
- a universal serial bus port electrically connected to said microprocessor, said universal serial bus port connected to said housing;
- a microphone electrically connected to said microprocessor, said microphone connected to said housing;
- a power switch electrically connected to said microprocessor, said power switch slidably connected to said housing;
- a power source connection electrically connected to said microprocessor;
- at least one function switch electrically connected to said microprocessor, said function switch slidably connected to said housing;
- a line out port electrically connected to said microprocessor, said line out port connected to said housing;
- a headphone set electrically connectable to said line out port; and
- a battery charge port electrically connected to said microprocessor, said battery charge port connected to said housing.

* * * * *